(12) United States Patent
Reed et al.

(10) Patent No.: US 7,995,790 B2
(45) Date of Patent: *Aug. 9, 2011

(54) DIGITAL WATERMARK DETECTION USING PREDETERMINED COLOR PROJECTIONS

(75) Inventors: Alastair M. Reed, Lake Oswego, OR (US); Brett T. Hannigan, Menlo Park, CA (US)

(73) Assignee: Digimarc Corporation, Beaverton, OR (US)

( * ) Notice: Subject to any disclaimer, the term of this patent is extended or adjusted under 35 U.S.C. 154(b) by 1138 days.

This patent is subject to a terminal disclaimer.

(21) Appl. No.: 11/427,265

(22) Filed: Jun. 28, 2006

(65) Prior Publication Data

US 2007/0147653 A1    Jun. 28, 2007

Related U.S. Application Data

(63) Continuation of application No. 09/771,340, filed on Jan. 26, 2001, now Pat. No. 7,072,487.

(51) Int. Cl.
*G06K 9/00* (2006.01)
(52) U.S. Cl. ........................... 382/100; 382/232
(58) Field of Classification Search ................. 382/100, 382/232; 380/210, 252, 287, 54; 713/176; 400/460; 386/94; 399/366; 283/902; 358/3.28
See application file for complete search history.

(56) References Cited

U.S. PATENT DOCUMENTS

| | | |
|---|---|---|
| 4,807,031 A | 2/1989 | Broughton et al. |
| 4,985,854 A | 1/1991 | Wittenburg |
| 5,051,835 A | 9/1991 | Bruehl |
| 5,444,779 A | 8/1995 | Daniele |
| 5,481,377 A | 1/1996 | Udagawa et al. |
| 5,530,751 A | 6/1996 | Morris |
| 5,530,759 A | 6/1996 | Braudaway |
| 5,617,119 A | 4/1997 | Briggs |
| 5,646,997 A | 7/1997 | Barton |
| 5,652,626 A | 7/1997 | Kawakami |
| 5,664,018 A | 9/1997 | Leighton |
| 5,687,236 A | 11/1997 | Moskowitz |
| 5,689,623 A | 11/1997 | Pinard |
| 5,721,788 A | 2/1998 | Powell |
| 5,772,250 A | 6/1998 | Gasper |
| 5,790,932 A | 8/1998 | Komaki et al. |
| 5,809,139 A | 9/1998 | Girod |

(Continued)

FOREIGN PATENT DOCUMENTS

EP    1137244    9/2001

(Continued)

OTHER PUBLICATIONS

Final Office Action on U.S. Appl. No. 09/771,340, mailed Jan. 11, 2005.

(Continued)

*Primary Examiner* — Brian Q Le

(57) ABSTRACT

The present invention relates to digital watermarking. In one implementation, a system is provided to read a digital watermark from digital imagery which includes data representing a number of pixels. Each pixel of the number of pixels is defined by a set of values representing color components of the particular pixel. The digital watermark is embedded in the digital imagery through modifications to at least some data representing the digital imagery. The system includes a filter to calculate values of pixels along a preferred projection axis, the preferred projection axis corresponds to a direction of embedding determined based on color characteristics of at least some pixels associated with the digital imagery; and a digital watermark reader which operates on values calculated by the filter. Other implementations are provided as well.

20 Claims, 4 Drawing Sheets

U.S. PATENT DOCUMENTS

| | | | |
|---|---|---|---|
| 5,825,892 | A | 10/1998 | Braudaway et al. |
| 5,859,920 | A | 1/1999 | Daly et al. |
| 5,862,218 | A | 1/1999 | Steinberg |
| 5,875,249 | A | 2/1999 | Mintzer |
| 5,893,101 | A | 4/1999 | Balogh |
| 5,915,027 | A | 6/1999 | Cox |
| 5,919,730 | A | 7/1999 | Gasper et al. |
| 5,930,369 | A | 7/1999 | Cox |
| 5,933,798 | A | 8/1999 | Linnartz |
| 5,943,422 | A | 8/1999 | Van Wie et al. |
| 5,946,414 | A | 8/1999 | Cass |
| 5,949,055 | A | 9/1999 | Fleet |
| 5,960,081 | A | 9/1999 | Vynne |
| 5,974,548 | A | 10/1999 | Adams |
| 6,044,156 | A | 3/2000 | Honsinger et al. |
| 6,104,812 | A | 8/2000 | Koltai et al. |
| 6,122,403 | A | 9/2000 | Rhoads |
| 6,188,766 | B1 | 2/2001 | Kocher |
| 6,188,776 | B1 | 2/2001 | Covell et al. |
| 6,272,634 | B1 | 8/2001 | Tewfik et al. |
| 6,304,345 | B1 | 10/2001 | Patton et al. |
| 6,320,675 | B1 | 11/2001 | Sakaki et al. |
| 6,332,031 | B1 | 12/2001 | Rhoads et al. |
| 6,404,926 | B1 | 6/2002 | Miyahara et al. |
| 6,449,367 | B2 | 9/2002 | Van Wie et al. |
| 6,466,209 | B1 | 10/2002 | Bantum |
| 6,504,941 | B2 | 1/2003 | Wong |
| 6,505,779 | B1 | 1/2003 | Power et al. |
| 6,559,975 | B1 | 5/2003 | Tolmer et al. |
| 6,563,935 | B1 | 5/2003 | Echizen et al. |
| 6,563,936 | B2 | 5/2003 | Brill et al. |
| 6,577,744 | B1 | 6/2003 | Braudaway et al. |
| 6,590,996 | B1 | 7/2003 | Reed et al. |
| 6,636,615 | B1 | 10/2003 | Rhoads et al. |
| 6,700,995 | B2 | 3/2004 | Reed |
| 6,718,046 | B2 | 4/2004 | Reed et al. |
| 6,721,440 | B2 | 4/2004 | Reed et al. |
| 6,728,390 | B2 | 4/2004 | Rhoads et al. |
| 6,744,906 | B2 | 6/2004 | Rhoads |
| 2001/0030759 | A1 | 10/2001 | Hayashi et al. |
| 2001/0030761 | A1 | 10/2001 | Ideyama |
| 2001/0033674 | A1 | 10/2001 | Chen et al. |
| 2001/0037455 | A1 | 11/2001 | Lawandy et al. |
| 2001/0040980 | A1 | 11/2001 | Yamaguchi |
| 2001/0052076 | A1 | 12/2001 | Kadono |
| 2002/0018879 | A1 | 2/2002 | Barnhart et al. |
| 2002/0027612 | A1 | 3/2002 | Brill et al. |
| 2002/0031241 | A1 | 3/2002 | Kawaguchi et al. |
| 2002/0054356 | A1 | 5/2002 | Kurita et al. |
| 2002/0054680 | A1 | 5/2002 | Huang et al. |
| 2002/0057823 | A1 | 5/2002 | Sharma et al. |
| 2002/0061121 | A1 | 5/2002 | Rhoads et al. |
| 2002/0076086 | A1 | 6/2002 | Yoshiura et al. |
| 2002/0085737 | A1 | 7/2002 | Kitamura |
| 2002/0101597 | A1 | 8/2002 | Hoover |
| 2002/0105679 | A1 | 8/2002 | Haynes |
| 2002/0105839 | A1 | 8/2002 | Sugahara et al. |
| 2002/0118381 | A1 | 8/2002 | Shirai |
| 2002/0153661 | A1 | 10/2002 | Brooks et al. |
| 2002/0163671 | A1 | 11/2002 | Takaragi |
| 2002/0171853 | A1 | 11/2002 | Wu |

FOREIGN PATENT DOCUMENTS

| | | |
|---|---|---|
| EP | 1209897 | 5/2002 |
| GB | 2360659 | 9/2001 |
| WO | 0108405 | 2/2001 |
| WO | WO 01/08405 | 2/2001 |
| WO | 0172030 | 9/2001 |
| WO | 0219269 | 3/2002 |
| WO | 0221846 | 3/2002 |
| WO | 02087250 | 10/2002 |
| WO | 02003744 | 1/2003 |

OTHER PUBLICATIONS

Final Office Action on U.S. Appl. No. 09/771,340, mailed Jan. 25, 2006.

International Preliminary Examination Report for PCT/US02/02325, completed Sep. 2, 2002.

International Search Report for PCT/US02/02325, mailed Jul. 12, 2002.

Non-Final Office Action on U.S. Appl. No. 09/771,340, mailed Mar. 17, 2004.

Non-Final Office Action on U.S. Appl. No. 09/771,340, mailed Jul. 26, 2005.

Notice of Allowance on U.S. Appl. No. 09/771,340, mailed Feb. 10, 2006.

Caramma, M., "A Blind and readable Watermarking Technique for Color images" Proc. Inter Conf on Image Proc. Sep. 10, 2000.

Fleet, D. J. Embedding Invisible Information in color images, Proc. Int. Conf. on Image Proc, Oct. 25, 1997.

Keith Jack, Video Demystified: A Handbook for the Digital Engineer Hightext Publication, San Diego, Chapter 3.

Joseph Vidal Non noticreable Information Embedding in Color Images 1999 IEEE 0-7803-5247-5/99.

Battiato et. al. "Robust Watermarking for Images Based on Color Manipulation", Third Int. Image Hiding Workshop 1999.

Fleet et al. "Embedding Invisible Information in Color Images", IEEE Int. Conf on Image Proc. Oct. 1997, vol. 1 pp. 532, 535.

Szepanski. W., "A Signal Theoretic Method for Creating Forgery-Proof Documents for Automatic Verification," Proc. of 1979 Carnahan Conference on Crime Countermeasures, pp. 101-109, May 16, 1979.

Bors, "Image Watermarking Using DCT Domain Constraints," Image Processing 1996, Proc. Int. Con. on, vol. 3, 1996, pp. 231-234, vol. 3.

Alattar, "Smart Images" Using Digimarc's Watermarking Technology, SPIE, 12th Int'l Symposium on Electronic Imaging, vol. 3971, No. 25, pp. 1-10, Jan. 2000.

Berghel et al., "Protecting Ownerships Rights Through Digital Watermarking," Computer, pp. 101-103, Jul. 1996.

Dautzenberg, "Watermarking images," Department of Microelectronics and Electrical Engineering, Trinity College Dublin, 47 pages, Oct. 1994.

Figure 1

| $P_{11}$ | $P_{12}$ | $P_{13}$ | $P_{14}$ | $P_{15}$ | $P_{16}$ | $P_{17}$ | $P_{18}$ | | |
|---|---|---|---|---|---|---|---|---|---|
| $P_{21}$ | $P_{22}$ | $P_{23}$ | $P_{24}$ | $P_{25}$ | $P_{27}$ | $P_{27}$ | | | |
| $P_{31}$ | $P_{32}$ | $P_{33}$ | $P_{34}$ | $P_{35}$ | $P_{36}$ | $P_{37}$ | | | |
| $P_{44}$ | $P_{44}$ | $P_{44}$ | $P_{44}$ | $P_{45}$ | $P_{46}$ | $P_{47}$ | | | |
| $P_{54}$ | $P_{54}$ | $P_{54}$ | $P_{54}$ | $P_{55}$ | $P_{56}$ | $P_{57}$ | | | |
| | | | | | | | | | |
| | | | | | | | | | |
| | | | | | | | | | |
| | | | | | | | | | |
| | | | | | | | | | $P_{xx}$ |

DIGITAL WATERMARK DETECTION USING PREDETERMINED COLOR PROJECTIONS

RELATED APPLICATION DATA

This application is a continuation of U.S. patent application Ser. No. 09/771,340 (now U.S. Pat. No. 7,072,487), filed Jan. 26, 2001, which is hereby incorporated by reference.

FIELD OF THE INVENTION

The present invention relates to steganography and more particularly to the detection of watermark in multi-colored images.

BACKGROUND OF THE INVENTION

Techniques for embedding and detecting watermarks in colored images must take into account that each pixel is defined by a plurality of numbers representing different colors. For example each pixel may have a red, a green and a blue value. Luminance is a single value that can be calculated from the multiple values that define a pixel. A watermark can be embedded in an image by changing the luminance value of the pixels in the image. The luminance of a pixel can be changed by making changes along a particular color axis.

A widely used watermarking embedding technique examines the luminance values in an area surrounding a particular pixel to determine the amount of change in luminance that should be applied to that particular pixel. The watermark is embedded by changing the colors of each pixel along a vector from black to the color of the pixel. This technique can be termed "scale to black" watermark embedding.

A widely used watermark reading technique operates on detected changes in the luminance values of an image. A change in luminance is determined by projecting color changes onto a luminance axis. The change in luminance of each pixel is equal to the change in magnitude of a vector from black to the color of the pixel, projected onto the luminance axis.

Other watermarking embedding and reading techniques select a particular color plane of an image and imbed and read the watermark into and from that color plane.

Some systems that read watermarks apply a non linear filter to the image to obtain a set of values from which the watermark (i.e. the grid signal or the data signals) is read. A non-linear filter can, in effect, calculate a value for each pixel based upon the value of the surrounding pixels. A variety of such non-linear filters have been proposed. Some take into account the value of all adjacent pixels, others take into account the value of the pixels on various axes such as the values on a set of cross axes.

SUMMARY OF THE PRESENT INVENTION

The present invention provides a new image filtering technique that matches the color axis of the watermark detector to the color direction used by the watermark embedder. With the present invention, during the watermark reading operation, the changes in the color values of each pixel are not projected onto a luminance axis or onto a particular color axis. With the present invention, a preferred projection axis is determined for each pixel. The preferred projection axis for each pixel approximates the axis used to insert the watermark in that pixel. The preferred projection axis does not necessarily coincide with the luminance axis or with the axis of any other color component of the image. The preferred projection axis for each pixel is determined by examining the color values in an area surrounding that pixel. Once the preferred projection axis for a pixel is determined the color values of that pixel are projected onto this axis to generate a set of values for the pixel. The grid or data signal can then be detected from these values using known techniques in the same way that a watermark can be read from the changes in luminance values of an image.

A second embodiment of the invention inserts two watermarks in an image. The two watermarks are inserted in orthogonal color directions. One of the watermarks can be a fragile watermark. This technique can be used to detect if an image has been duplicated.

BRIEF DESCRIPTION OF THE DRAWINGS

FIG. 1 illustrates the pixels in an image.

DETAILED DESCRIPTION

Digital color images generally consist of pixels or bits. The color of each pixel is specified by specifying the values for a plurality of colors such as RGB (red green blue), CYMK (cyan yellow magenta and black), etc. FIG. 1 illustrates an image that consists of pixels $P_{11}$ to $P_{xx}$. Each pixel $P_{11}$ to $P_{xx}$ has an associated value for each of the colors (RGB, CYMK, etc).

Figure 2:
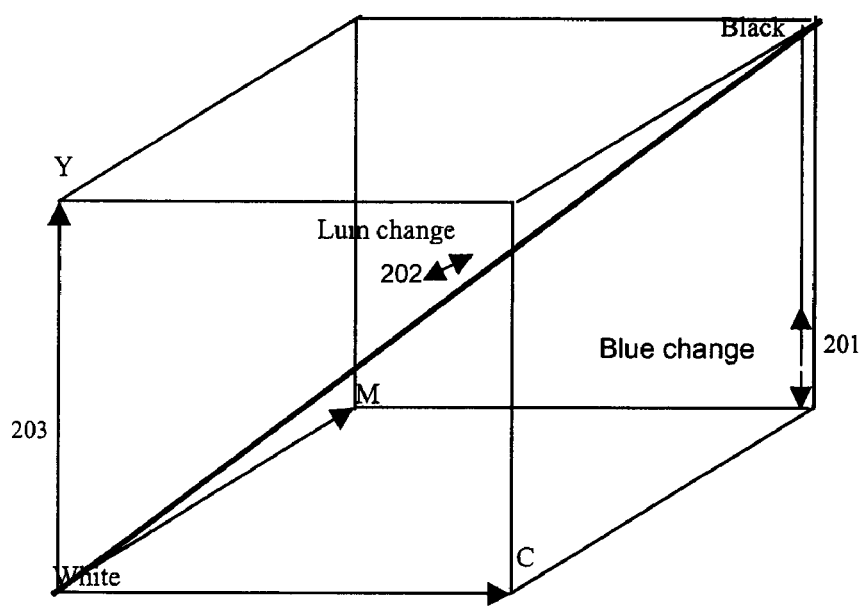
FIG. 2 illustrates the color vectors in a blue image printed with the conventional CYMK colors.

In order to better appreciate the present invention it is useful to first illustrate how some existing watermark reading programs operate. When reading a watermark some existing watermark reading programs calculate the change in luminance as illustrated in FIG. 2 and read the watermark from the calculated luminance changes using a correlation process. FIG. 2 illustrates a CYMK (cyan yellow magenta black) image; however, the process is similar for other color representations. The change in luminance of a pixel equals the change in magnitude of a vector from black to the color of the pixel projected onto the luminance axis. FIG. 2 illustrates that for a blue pixel a change in the blue color having a magnitude of the vector 201, results in a change in luminance equal to the vector 202. The point which should be noted is that the magnitude of vector 202 (from which the watermark is detected) is smaller than the magnitude of vector 201. If the image were an RGB image, the coordinates would be RGB instead of CYM, but the process and the result would be the same.

In general the present invention is directed to matching the color direction of the detection process to the color direction of the embedding process. This is accomplished by filtering the image in such a manner that the detection process is adaptive to the colors in the image.

The first embodiment of the invention described herein is directed to filtering an image, which has been watermarked by using the "scale to black" watermarking technique. The filtering provided by the present invention makes it easier to read the watermark. Many commercial watermarking programs (such as the watermarking program that is part of the Adobe Photoshop image editing program) embed watermarks using the scale to black technique. In order to watermark an image with the scale to black technique the particular change needed to insert a desired watermark in each pixel is calculated. The watermark is inserted by changing the colors of each pixel by, in effect, modifying a vector from black to the color of the pixel by the particular percentage needed to insert the desired watermark, By filtering an image using the present invention, the ability to detect and read the watermark using a correlation process is enhanced. In the particular embodiment described herein, the color of each pixel is represented by the colors RGB; however, it should be understood that the invention is equally applicable to images represented by other colors.

Figure 3:
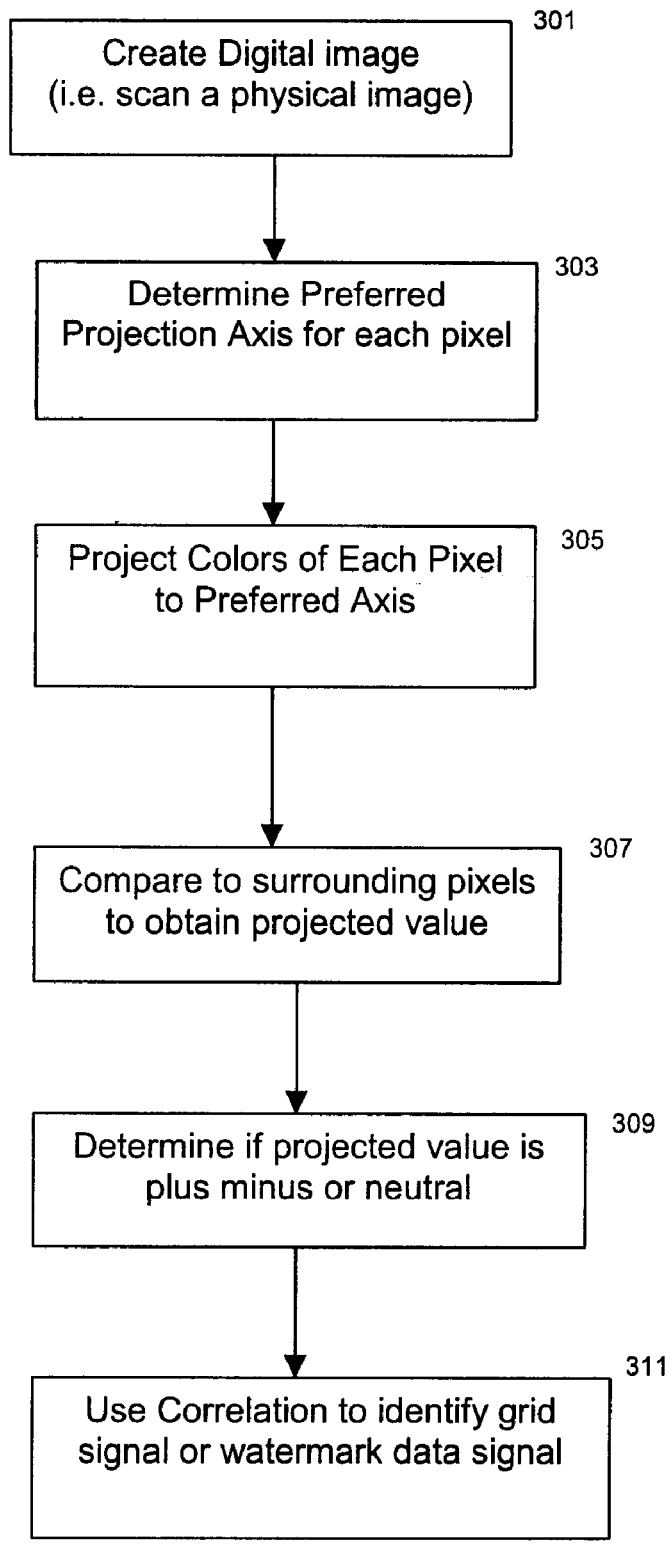
FIG. 3 is a block diagram showing the steps in a preferred embodiment.

FIG. 3 shows the operations performed by a first embodiment of the invention. As indicated by block 301, the process begins with a digital image that has been, for example, created by scanning a watermarked physical image. The process is directed to detecting a digital watermark in such a digital image. The digital image consists of a plurality of pixels as indicated in FIG. 1. There are three values for each pixel representing the value of the RGB color components of the color of the pixel.

As indicated by block 303, the "preferred projection axis" for each pixel is first determined as hereinafter explained. A single value for each pixel is next calculated by projecting the three color components of the pixel onto this axis. The calculated single value for each pixel is next compared to the value of the surrounding pixels to determine a projected value as indicated by block 309. Finally as indicated by block 311, correlation is used to detect and read the grid or watermark signal.

The calculation to determine the preferred projection axis will now be explained with respect to pixel $P_{45}$ shown in FIG. 1. The value of the color components of pixel $P_{45}$ are designated $R_{45} G_{45} B_{45}$. First average values (designated $aR_{45} aG_{45} aB_{45}$) for the RGB colors in the nine pixel area surrounding $P_{45}$ are calculated as follows:

$$aR_{45} aG_{45} aB_{45} \rightarrow \Sigma_1^9 R \Sigma_1^9 G \Sigma_1^9 B$$

These values are made into a unit vector by dividing by the square root of the sum of the squares of the values. The resulting unit vector designated $r_{45} g_{45} b_{45}$ is the preferred projection axis for that pixel.

The color values of the pixel $P_{45}$ are next projected onto the preferred projection axis by calculating the dot product of the two vectors as follows:

$$<r_{45}g_{65}b_{45}> \cdot <R_{45}G_{45}B_{45}>$$

The above calculation is done for each pixel in the image. The result is a set of values that can be used to first detect a grid signal. The image would then be scaled and oriented as appropriate and the above calculations would again be made and a watermark data detection algorithm applied. It is noted that the values calculated as described above, could be first be used to detect the grid signal, and then after the image is oriented, the same values (in a re-oriented location) could be used to detect the watermark data signal.

While the embodiment described above calculated the average values over a nine-pixel area, it is noted that in alternative embodiments the image is calculated over other size areas. For example the average could be calculated over a 100 by 100 pixel area or even over a larger area.

The correlation process to detect and read the grid and watermark data signals does not form a part of the present invention. Various techniques can be used to perform the detection and reading operation. For example, the watermark detection and reading process can be performed by watermark reading techniques described in publicly available literature or by the techniques described in co-pending application Ser. No. 09/186,962, filed Nov. 5, 1998 (now U.S. Pat. No. 7,171,016), or in co-pending application Ser. No. 09/503,881 filed Feb. 14, 2000 (now U.S. Pat. No. 6,614,914). The above referenced U.S. patent documents are hereby incorporated herein by reference.

FIG. 2 illustrates, as an example, a pure blue image printed using the conventional CYMK colors. FIG. 2 illustrates that when a watermark is embedded by a change in the luminance value reflecting a change in the color blue of a CYMK image, the watermark is predominantly in the yellow color. That is, with a blue image, indicated by the vector 201, a change in luminance indicated by the vector 202 will be primarily be reflected by changes in the yellow color 203.

With the present invention, the detector will automatically look for the watermark primarily in blue color direction as a result of calculating color channel weights as follows.

red_wt=red_ave/(red_ave+green_ave+blue_ave)

green_wt=green_ave/(red_ave+green_ave+blue_ave)

blue_wt=blue_ave/(red_ave+green_ave+blue_ave)

In a blue area, red_ave=0, green_ave=0, and blue_ave=255 i.e. red_wt=0, green_wt=0 and blue_wt=1. These values are used to weight the red, green and blue pixel values in a pixel block of a selected size (e.g. 3 by 3, 100 by 100, etc.) to create a single weighted average channel, which is used for watermark detection. Thus with the present invention the full blue change is seen by the detector.

The following illustrates what occurs if a watermark detection is done in the luminance channel instead of using the present invention. Luminance is conventionally calculated as follows:

Luminance=0.3*Red+0.6*Green+0.1*Blue

With the image illustrated in FIG. 2, if detection were done in the luminance channel a much smaller change would be detected. For example a change of 20 in blue would become a luminance change of 2.

It is also noted that by matching the color direction of the detector to the color direction used by the embedder, image noise that would otherwise interfere with the detector is effectively rejected. For example, in the example of a blue image given above any image data in the red and green channels would not interfere with the watermark in the blue channel.

To obtain the maximum benefit from the adaptive color detection, the camera color reproduction should be made as accurate as possible. Standard tools are available for achieving this, such as using ICC color profiles for the camera. For best results, a camera should be individually characterized, or less accurately a generic profile for the camera type can be used. An individual camera is characterized by reading a printed target with known color values. The target values are used to calculate the required color transformation to achieve the expected output values.

The size of the area over which the colors are averaged can range from a 3 by 3 area to an area multiple hundred pixels square. A small area will involve more computation time; however, it will generally provide better results for images that have color areas of smaller size. Watermarking programs generally insert watermarks several times in an image. The size of the area in which the watermark is inserted is sometimes referred to as the tile size. Averaging over an area the size of the watermark tile provides an advantage in that the detector program is configured to operate on pixel areas of this size.

Figure 4:
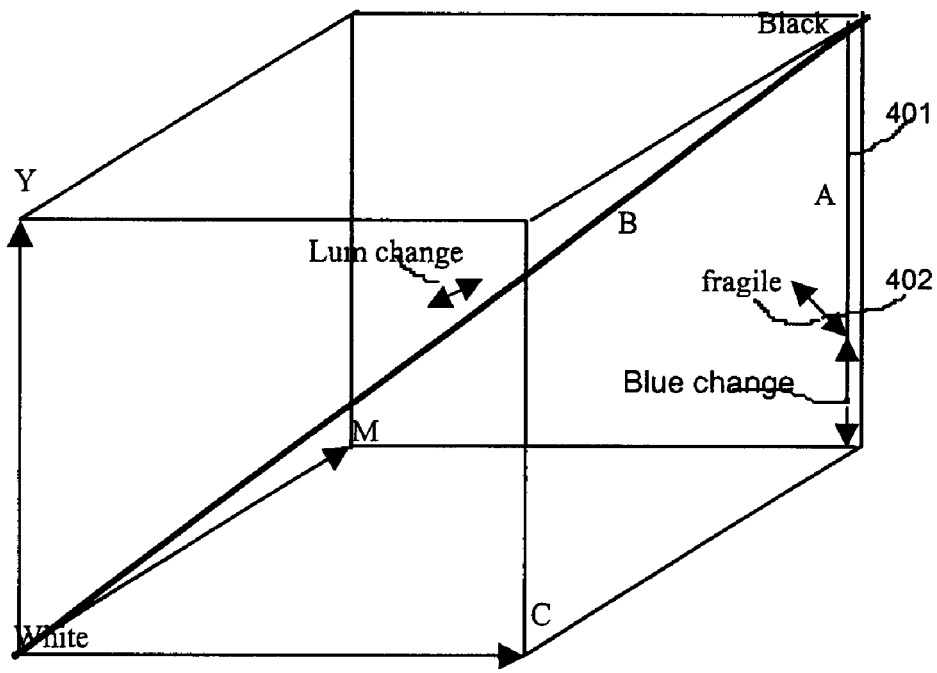
FIG. 4 illustrates use of the invention with two watermarks, one of which is a fragile watermark.

An alternate embodiment of the invention which utilizes two watermarks designated Mark 1 and Mark 2 is illustrated in FIG. 4. The second watermark, mark 2, has a lower intensity or strength than the first watermark, Mark 1. The lower strength makes it difficult to copy Mark 2 by scanning or photocopying the image. In order to keep the second watermark, mark 2, from interfering with the first watermark, mark 2 is inserted in a color space orthogonal to the first mark.

FIG. 4 illustrates an example of the color directions of the two watermarks. Mark 1 is inserted using a conventional "scale to black" technique. Hence for a blue color this can be represented as a change in the direction of the vector A designated 401. The second watermark is inserted in an orthogonal direction as indicated by the vector 402. In FIG. 4 the luminance axis is designated as vector B. The direction (designated "V") of the second water mark can be defined as the cross product of vector A and vector B. That is:

$$V = A \hat{} B$$

To help distinguish between the two watermarks, the second watermark can also have a different resolution from mark 1. For example mark 1 could be at 75 lpi and mark 2 at 300 lpi.

The first watermark is applied in the same manner as described above relative to the first embodiment. That is, the change needed to embed the first watermark is calculated by in effect scaling by an appropriate amount a vector between black and the color being changed.

The second watermark (i.e. the fragile watermark) is applied, by calculating a color change perpendicular to the direction of the first watermark. The perpendicular color vector (designated V) is calculated by calculating the cross product of vector A and vector B as indicated above. The fragile watermark is applied by scaling the vector V in the same way that the first watermark was applied by scaling a vector from black to the color.

In this example, the detector would first look for watermark 1 in the blue direction, and then for authentication look in the red direction. Mark 2 can have a much smaller payload, since it is only used to verify that mark 1 is valid. Such a scheme would also help diminishes the chances that an attacker can successfully recover the watermark signal from an image and embed it in another image in a manner that enables an accurate decoding of the watermark in the other image. This is the case since the 2 watermarks would be dependent upon the underlying image content. An attack which high pass filters an image and adds this signal to image 2, copies the watermark in a manner which is independent of image content, and would therefore probably fail an authentication step.

While the specific embodiments described herein relate to watermarks in a spatial domain with a particular form of scaling in the color space, the invention can also be used with other watermarking techniques such as those that make changes in the direction of other color vectors in a color space. In such an embodiment, the detector would project to a vector in a direction corresponding to the direction of the embedder.

It is also noted that there are numerous transform domains, including DCT, wavelet, Fourier, Hough, Karhunen Loeve, Haar, Hadamard, Radon, etc. etc. Color specific watermark embedding and detection can be implemented in these transform domains by dividing the image into blocks, transforming the blocks into desired color space (if not already represented in that space), transforming blocks into transform domain, modify transform coefficients according to some embedding function (which may be a linear or non-linear function of the transform coefficients), then inverse transform the modified data to get the watermarked image. Some other approaches make a calculation to get the watermark signal, then inverse transform the watermark signal to the spatial domain, and finally add the spatial domain watermark signal to the original host signal.

In such systems with the present invention the watermark decoder makes a color analysis (on a region by region basis, where the region can be of varying size as previously noted) to determine from which color space to decode the watermark, and then transforms the data to that space, transforms into the transform domain where the watermark signal was embedded, and applies a decode operation compatible with the embed operation (such as correlation, statistical feature calculation, quantization, statistical probability measure, etc.).

While the invention has been shown and described with respect to preferred embodiments of the invention, it should be understood that various changes in form and detail could be made without departing from the spirit and scope of the invention. The invention is limited only by the appended claims and equivalents thereto.

What is claimed is:

1. A system to read a digital watermark from digital imagery that includes data representing a number of pixels, wherein each pixel of the number of pixels is defined by a set of values representing color components of the particular pixel, and wherein the digital watermark is embedded in the digital imagery through modifications to at least some data representing the digital imagery, the system comprising:
    a filter for calculating values of pixels along a preferred projection axis, wherein the preferred projection axis corresponds to a direction of embedding determined based on color characteristics of at least some pixels associated with the digital imagery; and
    an electronic processing unit programmed as a digital watermark reader for operating on values calculated by the filter.

2. The system recited in claim 1 wherein the filter examines pixels in a neighborhood of pixels surrounding one or more of the pixels to determine the preferred projection axis.

3. The system recited in claim 2 wherein the digital watermark includes a spatial pattern of a predetermined size and wherein the filter examines pixels in an area of the spatial pattern to determine the preferred projection axis.

4. A method of reading a digital watermark from a color image that includes a plurality of pixels and that was digital watermarked using a scale to black digital watermarking technique, the method comprising:
    filtering the color image to generate filtered data by projecting color values of a set of pixels onto a selected axis that is determined by examining color of surrounding pixels—and not through filtering with a predetermined process without an examination of the color values; and
    using a programmed electronic processing unit, reading the watermark from resulting filtered data.

5. A method of reading a digital watermark from a digital image or video that includes a plurality of pixels, wherein each pixel of the plurality of pixels is defined by a set of numbers representing color components, the method comprising:
    filtering the set of numbers that represents each pixel by projecting the set of numbers to a selected axis, wherein a direction of the selected axis is determined by examining color values of pixels in an area associated with each pixel, and wherein the filtering provides results; and
    using a programmed electronic processing unit, reading a digital watermark from the results provided by the filtering.

6. The method recited in claim 5 wherein the filtering determines the direction of the selected axis for each pixel by examining values of pixels in a neighborhood of pixels surrounding each pixel.

7. A method of reading a digital watermark that has embedded as one or more luminance values of at least some pixels of an image or video by projecting color changes representing the digital watermark onto a luminance axis of each of the some pixels, the method comprising:

filtering the image prior to reading the digital watermark by first projecting color values of each pixel onto a preferred projection axis that is determined by examining color values of predetermined pixels, wherein at least the values are used to determine a direction of the axis; and using a programmed electronic processing unit, reading the watermark from data associated with a result of the filtering.

8. The system of claim 1 wherein the digital watermark reader comprises an electronic processing unit programmed to read digital watermarks.

9. A non-transitory computer readable medium comprising non-transitory instructions stored thereon to cause an electronic processing unit to perform the method of claim 4.

10. A non-transitory computer readable medium comprising non-transitory instructions stored thereon to cause an electronic processing unit to perform the method of claim 5.

11. A non-transitory computer readable medium comprising non-transitory instructions stored thereon to cause an electronic processing unit to perform the method of claim 6.

12. A non-transitory computer readable medium comprising non-transitory instructions stored thereon to cause an electronic processing unit to perform the method of claim 7.

13. An electronic system programmed to perform the method of claim 4.

14. An electronic system programmed to perform the method of claim 5.

15. An electronic system programmed to perform the method of claim 6.

16. An electronic system programmed to perform the method of claim 7.

17. The system of claim 1 wherein the filter comprises an electronic processing unit programmed for calculating values of pixels along a preferred projection axis.

18. A system to read a digital watermark from digital imagery that includes data representing a number of pixels, wherein each pixel of the number of pixels is defined by a set of values representing color components of the particular pixel, and wherein the digital watermark is embedded in the digital imagery through modifications to at least some data representing the digital imagery, the system comprising:

means for calculating values of pixels along a preferred projection axis, wherein the preferred projection axis corresponds to a direction of embedding determined based on color characteristics of at least some pixels associated with the digital imagery; and means for reading digital watermarking from values calculated by the filter.

19. The system recited in claim 18 wherein the means for calculating examines pixels in a neighborhood of pixels surrounding one or more of the pixels to determine the preferred projection axis.

20. The system recited in claim 18 wherein the digital watermark includes a spatial pattern of a predetermined size and wherein the means for calculating examines pixels in an area of the spatial pattern to determine the preferred projection axis.

* * * * *

UNITED STATES PATENT AND TRADEMARK OFFICE
CERTIFICATE OF CORRECTION

PATENT NO. : 7,995,790 B2
APPLICATION NO. : 11/427265
DATED : August 9, 2011
INVENTOR(S) : Reed et al.

It is certified that error appears in the above-identified patent and that said Letters Patent is hereby corrected as shown below:

On Title Page 2, item (56), under "Other Publications", Line 14, delete "Conf" and insert -- Conf. --.

On Title Page 2, item (56), under "Other Publications", Line 19, delete "noticreable" and insert -- noticeable --.

On Title Page 2, item (56), under "Other Publications", Line 24, delete "Conf" and insert -- Conf. --.

Signed and Sealed this
Third Day of January, 2012

David J. Kappos
*Director of the United States Patent and Trademark Office*